(12) United States Patent
Turner

(10) Patent No.: US 7,587,898 B2
(45) Date of Patent: Sep. 15, 2009

(54) INTERNAL COMBUSTION ENGINE

(75) Inventor: James William Griffith Turner, Norfolk (GB)

(73) Assignee: Lotus Cars Limited, Norfolk (GB)

( * ) Notice: Subject to any disclaimer, the term of this patent is extended or adjusted under 35 U.S.C. 154(b) by 244 days.

(21) Appl. No.: 10/585,588

(22) PCT Filed: Jan. 14, 2005

(86) PCT No.: PCT/GB2005/000117
§ 371 (c)(1),
(2), (4) Date: Jul. 11, 2006

(87) PCT Pub. No.: WO2005/068802
PCT Pub. Date: Jul. 28, 2005

(65) Prior Publication Data
US 2008/0216474 A1 Sep. 11, 2008

(51) Int. Cl.
*F02B 33/44* (2006.01)
*F02B 33/00* (2006.01)
*F02B 37/22* (2006.01)
*F02B 37/00* (2006.01)
*F02B 37/007* (2006.01)
*F02B 15/00* (2006.01)

(52) U.S. Cl. ............ 60/612; 123/562; 123/432
(58) Field of Classification Search ............ 60/612; 123/562, 432
See application file for complete search history.

(56) References Cited

U.S. PATENT DOCUMENTS

| 4,959,961 | A | 10/1990 | Hiereth et al. ............ 60/612 |
| 5,857,336 | A * | 1/1999 | Paul et al. ............ 60/597 |
| 6,279,320 | B1 | 8/2001 | Mailander ............ 60/612 |
| 6,595,183 | B1 * | 7/2003 | Olofsson ............ 123/90.15 |
| 7,308,872 | B2 * | 12/2007 | Sellnau et al. ............ 123/90.16 |
| 2007/0130948 | A1 * | 6/2007 | Boehm et al. ............ 60/612 |
| 2007/0235011 | A1 * | 10/2007 | Easley et al. ............ 123/568.13 |
| 2008/0091329 | A1 * | 4/2008 | Duret ............ 701/102 |

FOREIGN PATENT DOCUMENTS

EP     1400667 A2 *   3/2004

(Continued)

*Primary Examiner*—Thai Ba Trieu
(74) *Attorney, Agent, or Firm*—Fulwider Patton LLP

(57) ABSTRACT

With reference to FIG. 1, the present invention relates to an internal combustion engine comprising: a combustion chamber (10); first (A) and second (B) inlet valves controlling flow of air into the combustion chamber, first (C) and second (D) exhaust valves; and first (16) and second (18) turbochargers. The first turbocharger (16) is connected to the first inlet valve (A) and the second turbocharger (18) is connected to the second inlet valve (B). The first turbocharger (16) is connected to the first exhaust valve (C) and receives only combusted gases expelled via the first exhaust valve (C). The second turbocharger (18) is connected to the second exhaust valve (D) and all combusted gases expelled via the second exhaust valve flow to the second turbocharger (18) without passing through the first turbo-charger (16). The first inlet valve (A) and first exhaust valve (C) arc controlled independently from the second inlet valve (B) and the second exhaust valve (D) to provide variation in the ratio of the mass of charge air supplied to the combustion chamber (10) via the first inlet valve (A) to the mass of charge air supplied to the combustion chamber (10) via the second inlet valve (B).

10 Claims, 1 Drawing Sheet

FOREIGN PATENT DOCUMENTS

Figure 1:
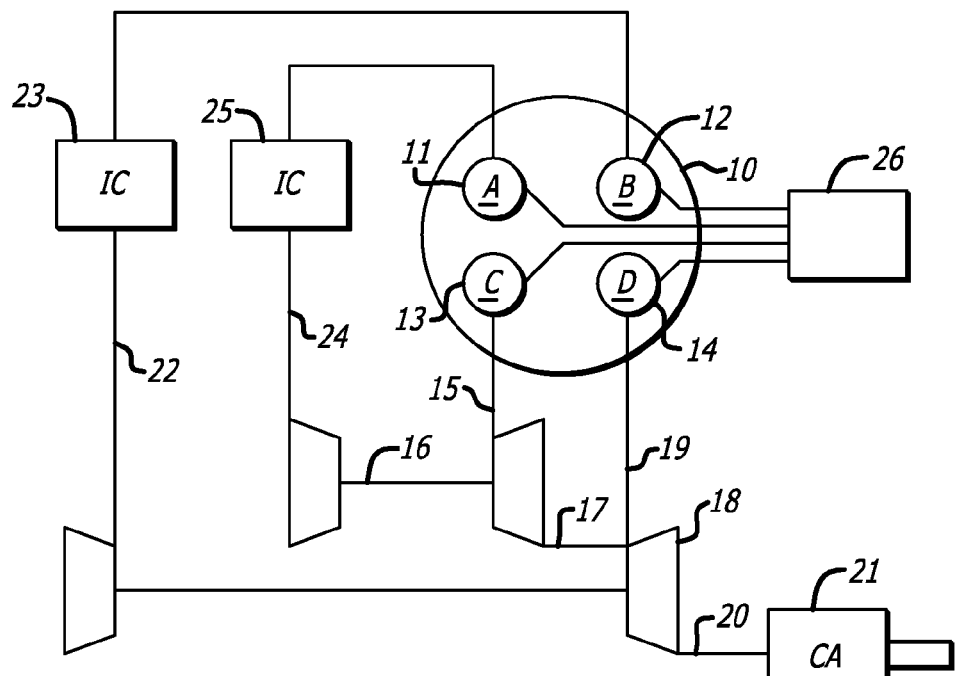

| | | |
|---|---|---|
| JP | 59-147823 A | 8/1984 |
| JP | 61-164039 A | 7/1986 |
| JP | 61-210224 | 9/1986 |
| JP | 06280586 A * | 10/1994 |
| JP | 08109829 A * | 4/1996 |
| JP | 08135453 A * | 5/1996 |
| JP | 2002030980 A * | 1/2002 |

* cited by examiner

INTERNAL COMBUSTION ENGINE

RELATED APPLICATIONS

This application is a U.S. national phase of PCT/GB2005/000117, filed 14 Jan. 2005, which claims priority from Great Britain Application Serial No. 0400808.2, filed Jan. 14, 2004 and Great Britain Application Serial No. 0425533.7, filed Nov. 19, 2004.

The present invention relates to a turbo-charged internal combustion engine.

It is a technical problem to provide a turbo-charged engine which makes effective use of turbo-charging over a large range of engine speeds and loads. It is desirable to provide an engine with a simple way of controlling the amount of turbo-charged air delivered to a combustion chamber and also the degree of swirl and/or tumble motion imparted to the air on delivery.

The present invention provides an internal combustion engine comprising:
a combustion chamber;
first and second inlet valves controlling flow of air into the combustion chamber;
first and second exhaust valves controlling flow of combusted gases out of the combustion chamber; and
first and second turbo-chargers; wherein:
the first turbo-charger is connected to the first inlet valve and the second turbo-charger is connected to the second inlet valve;
charge air supplied to the combustion chamber via the first inlet valve is pressurised only by first turbo-charger;
charge air supplied to the combustion chamber via the second inlet valve is pressurised only by the second turbo-charger;
the first turbo-charger is connected to the first exhaust valve and receives only combusted gases expelled via the first exhaust valve;
the second turbo-charger is connected to the second exhaust valve and all combusted gases expelled via the second exhaust valve flow to the second turbo-charger without passing through the first turbo-charger;
valve operating means controls operation of the first inlet valve and first exhaust valve independently from the operation of the second inlet valve and second exhaust valve thereby providing variation in the ratio of the mass of charge air supplied to the combustion chamber via the first inlet valve to the mass of charge air supplied to the combustion chamber via the second inlet valve; and
the valve operating means is controlled by an electrical controller to vary operation of the inlet and exhaust valves and thereby the turbo-chargers having regard to changes in engine operating conditions, the controller being able to select between different modes of operations, including:
a first operating mode in which the valve operating means deactivates the second inlet valve and the second exhaust valve whereby all charge air supplied to the combustion chamber is pressurised by the first turbo-charger and delivered via the first inlet valve; and
a second operating mode in which the valve operating means operates simultaneously the first and second inlet valves and the first and second exhaust valves whereby charge air supplied to the combustion chamber is pressurised by both of the first and second turbo-chargers and delivered via both the first and second inlet valves;
characterised in that:
the controller can also select a third operating mode in which the valve operating means deactivates the first inlet valve and the first exhaust valve whereby all charge air supplied to the combustion chamber is pressurised by the second turbo-charger and delivered via the second inlet valve.

Figure 2:
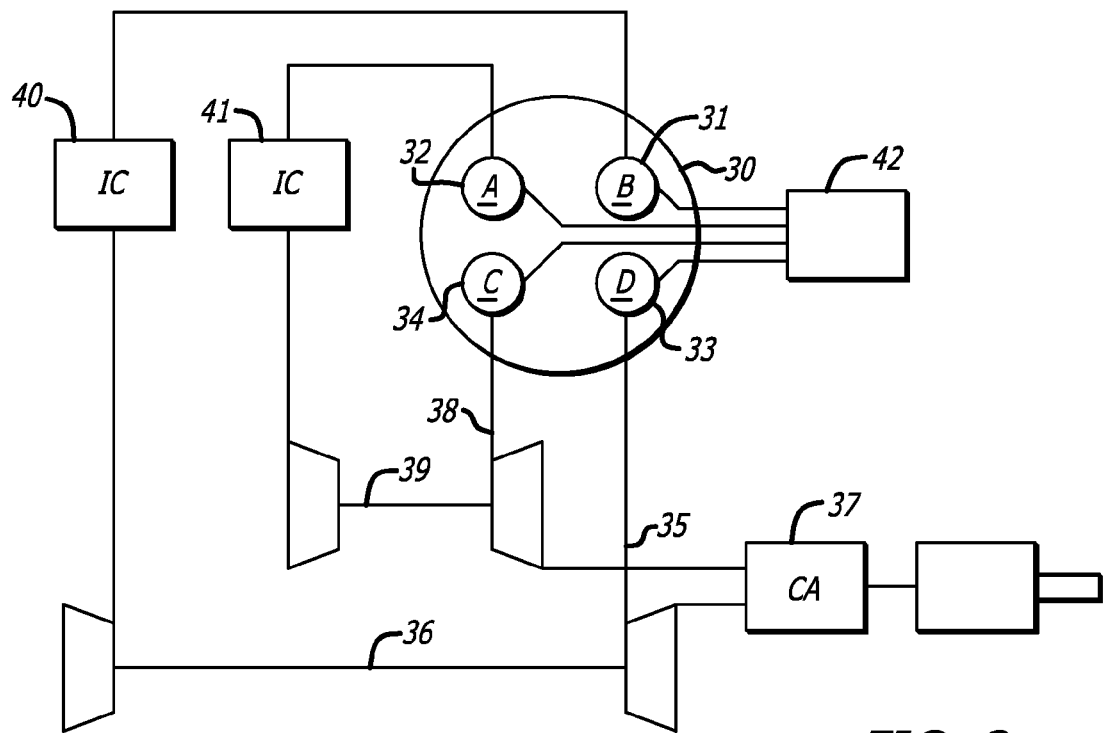

Preferred embodiments of the present invention will now be described with reference to the accompanying drawings in which:

FIG. 1 is a schematic illustration of a first embodiment of a turbo-charged internal combustion engine according to the present invention; and FIG. 2 is a schematic illustration of a second embodiment of a turbo-charged internal combustion engine according to the present invention.

In FIG. 1 there can be seen a single cylinder engine with a combustion chamber 10 having two inlet valves 11, 12 and two exhaust valves 13, 14. Each of the inlet valves 11, 12 exhaust valves 13, 14 is operated by a valve operating mechanism 26 which allows the respective valve to be deactivated.

The valve operating mechanism could be a cam profile switching mechanism, perhaps operated in conjunction with a cam phasing mechanism. Alternatively (and preferably) the valve operating mechanism comprises an actuator (e.g. an electrically-controlled hydraulic actuator) for each valve.

An exhaust duct 15 connects the exhaust valve 13 to a first turbo-charger 16. All exhaust gases flowing through the exhaust duct 15 must flow through the turbo-charger 16, after which they then flow through an exhaust duct 17 which leads gases from an outlet of first turbo-charger 16 to an inlet of a second turbo-charger 18. An exhaust duct 19 connects the exhaust valve 14 directly to the turbo-charger 18, bypassing the turbo-charger 16 altogether. All gases flowing through the turbo-charger 18 are directed through an exhaust passage 20 and a catalytic converter 21 to atmosphere. The turbo-charger 18 is a low pressure turbo-charger and the turbo-charger 16 is a high pressure turbo-charger.

Inlet air pressurised by the turbo-charger 18 is supplied to the inlet valve 12 by an inlet duct 22, passing through an intercooler 23 on the way. Inlet air pressurised by the turbo-charger 16 is supplied to the inlet valve 11 by an inlet duct 24, passing through an intercooler 25 on the way. The air supplied to the inlet valve 11 is completely independent of the air supplied to the inlet valve 12; the inlet valve 11 is supplied only with air pressurised by the turbo-charger 18 and the inlet valve 12 is supplied only with air pressurised by the turbo-charger 16.

The engine of FIG. 1 is a diesel engine and for this reason the inlet port which is opened and closed by valve 12 is designed to impart a high degree of swirl motion to air flowing therethrough. The port opened and closed by valve 11 is not a "high swirl" port and instead is designed to allow relatively unimpeded flow of charge air therethrough.

At low engine speeds or loads the valve operating mechanism will deactivate the inlet valve 11 and the exhaust valve 13 and operate only the inlet valve 12 and exhaust valve 14. Thus no exhaust gases flow through the turbo-charger 16, which remains inoperative. The low pressure turbo-charger 18 is driven by exhaust gas flowing past the exhaust valve 14 and through exhaust duct 19. The turbo-charger compresses air which is fed along the inlet duct 22 through the intercooler 23 and allowed into the combustion chamber 10 via the inlet valve 12 with the inlet port giving a high degree of swirl to the charge air as it enters the combustion chamber 10, where it is compressed and diesel fuel is injected and the mixture ignited by compression ignition.

At high engine speeds and loads the valve operating mechanism will operate both inlet valves 11, 12 and both exhaust valves 13, 14. Thus exhaust gases will be supplied to both turbo-chargers 16, 18 which are driven to compress charge air which is then supplied to the combustion chamber 10 via both inlet valves 11, 12. The combusted gases leaving the turbo-charger 16 are supplied to the turbo-charger 18 to assist in the driving of the turbo-charger 18. Operation of the exhaust valves 13, 14 and the inlet valves 11, 12 preferably can be controlled by an engine management system to vary for different engine operating conditions (e.g. engine speed, load, temperature during acceleration, during deceleration) what percentage of the total charge air supplied to the combustion chamber 10 is supplied via the inlet valve 10 and what percentage is supplied via the inlet valve 12.

In FIG. 2 there can be seen a single cylinder engine with a combustion chamber 30 having two inlet valves 31, 32 and two exhaust valves 33, 34. Each of valves is operated by a valve operating mechanism 42 which allows the respective valve to be deactivated, e.g. by a cam profile switching mechanism (perhaps in combination with a cam phasing mechanism) or an actuator (perhaps an electro-hydraulic actuator) for each valve.

An exhaust duct 35 connects the exhaust valve 33 to a first turbo-charger 36. All exhaust gases flowing through the exhaust duct 35 pass through the turbo-charger 36 and the via a catalytic converter 37 to atmosphere. An exhaust duct 38 connects the exhaust valve 34 to a second turbo-charger 39. All exhaust gases flowing through the exhaust duct 38 pass through the turbo-charger 39 and then via the catalytic converter 37 to atmosphere. Thus the flow of exhaust gases through the exhaust duct 35 and turbo-charger 36 is kept separate from the flow of exhaust gas through the exhaust duct 38 and turbo-charger 39; the exhaust gases mix only at the catalytic converter 37.

Air drawn in by the turbo-charger 36 is pressurised and then relayed to the inlet valve 31 via an intercooler 40. Air drawn in by the turbo-charger 39 is pressurised and then relayed to the inlet valve 32 via an intercooler 41.

The FIG. 2 engine can be operated so that only the inlet valve 31, exhaust valve 33 and turbo-charger 36 are functional or so that only the inlet valve 32, exhaust valve 34 and turbo-charger 39 are functional. The FIG. 2 engine can also be operated so that all the valves and both turbo-chargers are active; preferably the control of valve operation will enable control of what proportion of the charge air supplied to the combustion chamber 30 is supplied via the inlet valve 31 and what proportion is supplied via the inlet valve 32.

Preferably the inlet ports surrounding the inlet valves 31,32 are configured to give different flow characteristics to charge air passing therethrough, e.g. one could be high swirl port and the other a high tumble or a filling port.

The turbo-chargers 36, 39 could be identical, but would preferably be different aerodynamically, with, e.g. one producing charged air at a higher pressure than the other.

Comparing the FIG. 1 engine with the FIG. 2 engine, the FIG. 1 engine could be said to have turbo-chargers arranged with sequential turbines and parallel compressors, while the FIG. 2 engine has turbo-chargers arranged with parallel turbines and parallel compressors.

Whilst above the engines have been described as diesel engines, the engines could equally well be gasoline engines.

The use of two turbo-chargers of different characteristics can enable operation of the engines without waste gates for the turbo-chargers, which improves efficiency.

A high pressure turbo-charger typically has a smaller rotor than the high pressure turbo-charger and can be spun up to speed quickly, but it does offer higher impedance to flow of exhaust gases than the low pressure turbo-charger. The high pressure turbo-charger could be switched in during acceleration of the engine and switched out for steady-state operation of the engine. The high pressure turbo-charger will give the fast response desirable for acceleration whilst a low pressure turbo-charger will give the lower flow impedance desirable for steady state operation.

With the use of electro-hydraulic actuators it is possible to control mass flow through the engine by opening and closing the inlet valves (or at least the one operated inlet valve) by different amounts of lift and duration in different intake strokes of the engine.

For reasons of simplicity the invention has been described with reference only to single cylinder engines, but it will be understood that the invention could be applied to multi-cylinder engines, in which case each cylinder would have one exhaust valve and one inlet valve connected to a first turbo-charger and a second exhaust valve and second inlet valve connected to a second turbo-charger.

The invention claimed is:

1. An internal combustion engine comprising:
   a combustion chamber;
   first and second inlet valves controlling flow of air into the combustion chamber;
   first and second exhaust valves controlling flow of combusted gases out of the combustion chamber; and
   first and second turbo-chargers; wherein:
   the first turbo-charger is connected to the first inlet valve and the second turbo-charger is connected to the second inlet valve;
   charge air supplied to the combustion chamber via the first inlet valve is pressurised only by the first turbo-charger;
   charge air supplied to the combustion chamber via the second inlet valve is pressurised only by the second turbo-charger;
   the first turbo-charger is connected to the first exhaust valve and receives only combusted gases expelled via the first exhaust valve;
   the second turbo-charger is connected to the second exhaust valve and all combusted gases expelled via the second exhaust valve flow to the second turbo-charger without passing through the first turbo-charger; and
   a valve operating means for controlling operation of the first inlet valve and first exhaust valve independently from the operation of the second inlet valve and second exhaust valve thereby providing variation in the ratio of the mass of charge air supplied to the combustion chamber via the first inlet valve to the mass of charge air supplied to the combustion chamber via the second inlet valve, wherein said valve operating means for operating in different modes of operations, including:
   a first operating mode in which the second inlet valve and the second exhaust valve are deactivated whereby all charge air supplied to the combustion chamber is pressurised by the first turbo-charger and delivered via the first inlet valve;
   a second operating mode in which the first and second inlet valves and the first and second exhaust valves operate simultaneously whereby charge air supplied to the combustion chamber is pressurised by both of the first and second turbo-chargers and delivered via both the first and second inlet valves; and
   a third operating mode in which the first inlet valve and the first exhaust valve are deactivated whereby all charge air supplied to the combustion chamber is pressurised by the second turbo-charger and delivered via the second inlet valve.

2. An internal combustion engine as claimed in claim 1 wherein combusted gases leaving each of the first and second turbo-chargers are relayed to exhaust without passing through the other turbo-charger.

3. An internal combustion engine as claimed in claim 2 wherein the first inlet port imparts to the charge air flowing therethrough a degree of swirl greater than the degree of swirl imparted to charge air flowing through the second inlet port.

4. An internal combustion engine as claimed in claim 2 wherein the first turbo-charger is a low pressure turbo-charger and the second turbo-charger is a high pressure turbo-charger.

5. An internal combustion engine as claimed in claim 1 wherein the first inlet valve is associated with a first inlet port which imparts to charge air flowing therethrough a flow characteristic different to a flow characteristic imparted to charge air flowing through a second inlet port associated with the second inlet valve.

6. An internal combustion engine as claimed in claim 1 comprising a first intercooler for cooling air pressurised by the first turbo-charger before the air flows into the combustion chamber via the first inlet valve and a second intercooler for cooling air pressurised by the second turbo-charger before the air flows into the combustion chamber via the second inlet valve.

7. An internal combustion engine as claimed in claim 1 wherein the first turbo-charger is a low pressure turbo-charger and the second turbo-charger is a high pressure turbo-charger.

8. An internal combustion engine as claimed in claim 7 wherein the valve operating means increases flow of exhaust gas to the high pressure turbo-charger and thereby air flow through the high pressure turbo-charger to the second inlet valve during periods of acceleration of the engine.

9. An internal combustion engine as claimed in claim 7 wherein the valve operating increases flow of exhaust gas to the high pressure turbo-charger with increasing engine speed and thereby flow of charge air through the high pressure turbo-charger to the second inlet valve.

10. An internal combustion engine as claimed in claim 1 wherein the valve operating means comprises an electro-hydraulic actuator individual to each inlet valve and each exhaust valve and controlled by an electrical controller.

* * * * *

UNITED STATES PATENT AND TRADEMARK OFFICE
CERTIFICATE OF CORRECTION

PATENT NO. : 7,587,898 B2  
APPLICATION NO. : 10/585588  
DATED : September 15, 2009  
INVENTOR(S) : James William Griffith Turner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 307 days.

Signed and Sealed this

Twenty-first Day of September, 2010

David J. Kappos  
*Director of the United States Patent and Trademark Office*